(12) United States Patent
Vogler et al.

(10) Patent No.: US 9,660,412 B2
(45) Date of Patent: May 23, 2017

(54) FEMTOSECOND ULTRAVIOLET LASER

(71) Applicant: Wavelight GmbH, Erlangen (DE)

(72) Inventors: Klaus Vogler, Blankenhain (DE); Joerg Klenke, Nürnberg (DE); Johannes Loerner, Erlangen (DE)

(73) Assignee: Novartis AG (CH)

( * ) Notice: Subject to any disclaimer, the term of this patent is extended or adjusted under 35 U.S.C. 154(b) by 0 days.

(21) Appl. No.: 15/008,326

(22) Filed: Jan. 27, 2016

(65) Prior Publication Data

US 2016/0240996 A1 Aug. 18, 2016

(30) Foreign Application Priority Data

Feb. 17, 2015 (WO) .................. PCT/EP2015/053272

(51) Int. Cl.
| | | |
|---|---|---|
| *H01S 3/109* | (2006.01) | |
| *H01S 3/16* | (2006.01) | |
| *G02F 1/35* | (2006.01) | |
| *G02F 1/37* | (2006.01) | |

(52) U.S. Cl.
CPC ............ *H01S 3/109* (2013.01); *G02F 1/3534* (2013.01); *G02F 1/37* (2013.01); *H01S 3/163* (2013.01); *H01S 3/1688* (2013.01); *G02F 2001/354* (2013.01); *G02F 2001/3548* (2013.01); *G02F 2201/16* (2013.01); *G02F 2202/20* (2013.01)

(58) Field of Classification Search
CPC ......... H01S 3/109; H01S 3/163; H01S 3/1688
See application file for complete search history.

(56) References Cited

U.S. PATENT DOCUMENTS

| | | | | |
|---|---|---|---|---|
| 5,984,916 A | * | 11/1999 | Lai ..................... | B23K 26/0624 606/10 |
| 6,347,102 B1 | | 2/2002 | Konno et al. | |
| 7,088,749 B2 | * | 8/2006 | Nakayama ............. | H01S 3/109 372/22 |
| 2003/0026573 A1 | * | 2/2003 | Mizuuchi ............... | G02B 6/125 385/129 |
| 2004/0131092 A1 | | 7/2004 | Nakayama et al. | |

(Continued)

FOREIGN PATENT DOCUMENTS

| | | |
|---|---|---|
| CN | 1400503 A | 3/2003 |
| CN | 1518178 A | 8/2004 |

OTHER PUBLICATIONS

Oleg A. Louchev, et al.; Numerical study and optimization of third harmonics generation in two-sectioned periodically poled LiTaO3; Nonlinear Optics and Applications III, edited by Mario Bertolotti, Proc. of SPIE vol. 7354; pp. 7354-73540Y-8; May 28, 2009; doi: 10.1117/12.820585.

(Continued)

*Primary Examiner* — Michael Carter

(57) ABSTRACT

A method and system for generating femtosecond (fs) ultraviolet (UV) laser pulses enables stabile, robust, and optically efficient generation of third harmonic fs laser pulses using periodically-poled quasi-phase-matched crystals. The crystals have different numbers of periodically poled crystalline layers that enable a long conversion length without back-conversion and without a special phase-matching direction. The fs UV laser may have a high conversion efficiency and may be suitable for high power operation.

18 Claims, 2 Drawing Sheets

(56) References Cited

U.S. PATENT DOCUMENTS

2007/0263693 A1* 11/2007 Essaian .................. H01S 3/113
372/75

OTHER PUBLICATIONS

Xiaodong Mu, et al.; "Efficient third-harmonic generation in partly periodically poled KtiOPO4 crystal"; Optics Letters; vol. 26; No. 9; May 1, 2001; pp. 623-625.
Junji Hirohashi et al.; "355nm generation by Fan-out PP-LBGO device"; 2014 Conference on Lasers and Electro-Optics (CLEO); Optical Society of America; Jun. 8, 2014; pp. 1-2; XPO32707141.
International Search Report and the Written Opinion of the International Searching Authority; International Application No. PCT/EP2015/053272; European Patent Office; dated Nov. 12, 2015; 14 pages.

* cited by examiner

200 — METHOD FOR GENERATING AN FS UV LASER PULSE

- DIRECT AN FS NIR LASER PULSE AT A NONLINEAR OPTICAL CRYSTAL — 202
- CONVERT AT LEAST SOME OF THE NIR PHOTONS TO VISIBLE PHOTONS AT A FIRST PORTION OF THE NONLINEAR OPTICAL CRYSTAL BY SHG — 204
- CONVERT AT LEAST SOME OF THE NIR PHOTONS AND THE VISIBLE PHOTONS TO UV PHOTONS AT A SECOND PORTION OF THE NONLINEAR OPTICAL CRYSTAL BY THG — 206
- SPECTRALLY SEPARATE THE UV PHOTONS FROM AN OUTPUT PULSE OF THE NONLINEAR OPTICAL CRYSTAL, THE OUTPUT PULSE INCLUDING AT LEAST SOME OF THE NIR PHOTONS, AT LEAST SOME OF THE THE VISIBLE PHOTONS, AND THE UV PHOTONS — 208
- OUTPUT AN FS UV LASER PULSE — 210

FIG. 2

FEMTOSECOND ULTRAVIOLET LASER

CROSS REFERENCE TO RELATED APPLICATIONS

This application claims priority to International Application Number PCT/EP2015/053272, filed 17 Feb. 2015, titled "FEMTOSECOND ULTRAVIOLET LASER," which is hereby incorporated by reference in its entirety.

BACKGROUND

Field of the Disclosure

The present disclosure relates to laser beam generation, and more specifically, to a femtosecond ultraviolet laser.

Description of the Related Art

In recent years, femtosecond lasers have been developed for various applications in eye surgery, among other uses. Because of the very short pulse duration in the femtosecond range, femtosecond lasers are capable of developing a high energy intensity at a target material, such as eye tissue, which leads to non-linear photodisruption processes that result in tissue cleavage and avoids detrimental thermal effects.

Typical wavelengths for commercial femtosecond lasers are in the near infrared range of the spectrum, having wavelengths at about 1000-1100 nanometers (nm).

SUMMARY

In one aspect, a disclosed method for generating femtosecond ultraviolet lasers may include directing, at a nonlinear optical crystal, a first laser pulse having a fundamental wavelength in a near infrared portion of the electromagnetic spectrum, the first laser pulse having a pulse duration of less than 1000 femtoseconds. The method may include converting, at a first portion of the nonlinear optical crystal, at least some photons from the first laser pulse to a second harmonic wavelength of the fundamental wavelength to generate a second laser pulse within the nonlinear optical crystal. The method may also include converting, at a second portion of the nonlinear optical crystal, at least some photons from the first laser pulse and the second laser pulse to a third harmonic wavelength of the fundamental wavelength to generate a third laser pulse within the nonlinear optical crystal. The method may further include outputting the third laser pulse from the nonlinear optical crystal, such that the third laser pulse has the pulse duration.

In any of the disclosed embodiments, the method may include outputting the first laser pulse and the second laser pulse from the nonlinear optical crystal. In any of the disclosed embodiments of the method, the nonlinear optical crystal may include a periodically-poled quasi-phase-matched crystal. In any of the disclosed embodiments of the method, the first portion of the nonlinear optical crystal and the second portion of the nonlinear optical crystal may be formed as a single unitary material. In any of the disclosed embodiments of the method, the first portion of the nonlinear optical crystal may include a periodically poled magnesium oxide-doped stoichiometric lithium tantalate crystal. In any of the disclosed embodiments of the method, the second portion of the nonlinear optical crystal may include a periodically poled lanthanum barium germanium oxide crystal.

In any of the disclosed embodiments, the method operation of directing the first laser pulse may further include focusing the first laser pulse at the nonlinear optical crystal.

In any of the disclosed embodiments, the method may include spectrally filtering, at the output of the nonlinear optical crystal, the third laser pulse from the first laser pulse and the second laser pulse. In any of the disclosed embodiments of the method, the nonlinear optical crystal may include periodically poled layers that are tuned according to the fundamental wavelength. In any of the disclosed embodiments of the method, a first cross-sectional intensity pattern of the first laser pulse may match a second cross-sectional intensity pattern of the third laser pulse.

In another aspect, a disclosed femtosecond ultraviolet laser source may include a laser source including a femtosecond near infrared pulsed laser, the laser source having a pulse duration of less than 1000 femtoseconds and having a fundamental wavelength. The femtosecond ultraviolet laser source may include a nonlinear optical crystal having a first portion and a second portion successively oriented with regard to an orientation of incident photons from the laser source. In the femtosecond ultraviolet laser source, the first portion of the nonlinear optical crystal may receive first photons from the laser source and may convert at least some of the first photons to second photons having a second harmonic wavelength of the fundamental wavelength to generate a second laser pulse. In the femtosecond ultraviolet laser source, the second portion of the nonlinear optical crystal may receive at least some of the first photons and the second photons and may convert at least some of the first photons and the second photons to third photons having a third harmonic wavelength of the fundamental wavelength to generate a third laser pulse having the pulse duration.

In any of the disclosed embodiments of the femtosecond ultraviolet laser source, the second portion may output the first laser pulse, the second laser pulse, and the third laser pulse from the nonlinear optical crystal. In the femtosecond ultraviolet laser source, the nonlinear optical crystal may include a periodically-poled quasi-phase-matched crystal. In the femtosecond ultraviolet laser source, the first portion of the nonlinear optical crystal and the second portion of the nonlinear optical crystal may be formed as a single unitary material. In the femtosecond ultraviolet laser source, the first portion of the nonlinear optical crystal may include a periodically poled magnesium oxide-doped stoichiometric lithium tantalate crystal. In the femtosecond ultraviolet laser source, the second portion of the nonlinear optical crystal may include a periodically poled lanthanum barium germanium oxide crystal.

In any of the disclosed embodiments, the femtosecond ultraviolet laser source may include a focusing element to focus the first laser pulse at the nonlinear optical crystal. In any of the disclosed embodiments, the femtosecond ultraviolet laser source may include an optical filter to spectrally separate, at the output of the nonlinear optical crystal, the third laser pulse from the first laser pulse and the second laser pulse. In any of the disclosed embodiments of the femtosecond ultraviolet laser source, the nonlinear optical crystal may include periodically poled layers that are tuned according to the fundamental wavelength. In any of the disclosed embodiments of the femtosecond ultraviolet laser source, a first cross-sectional intensity pattern of the first laser pulse may match a second cross-sectional intensity pattern of the third laser pulse.

BRIEF DESCRIPTION OF THE DRAWINGS

For a more complete understanding of the present invention and its features and advantages, reference is now made to the following description, taken in conjunction with the accompanying drawings, in which:

FIG. 2 is a flow chart of selected elements of a method for generating a femtosecond ultraviolet laser pulse.

DESCRIPTION OF PARTICULAR EMBODIMENT(S)

Figure 1:
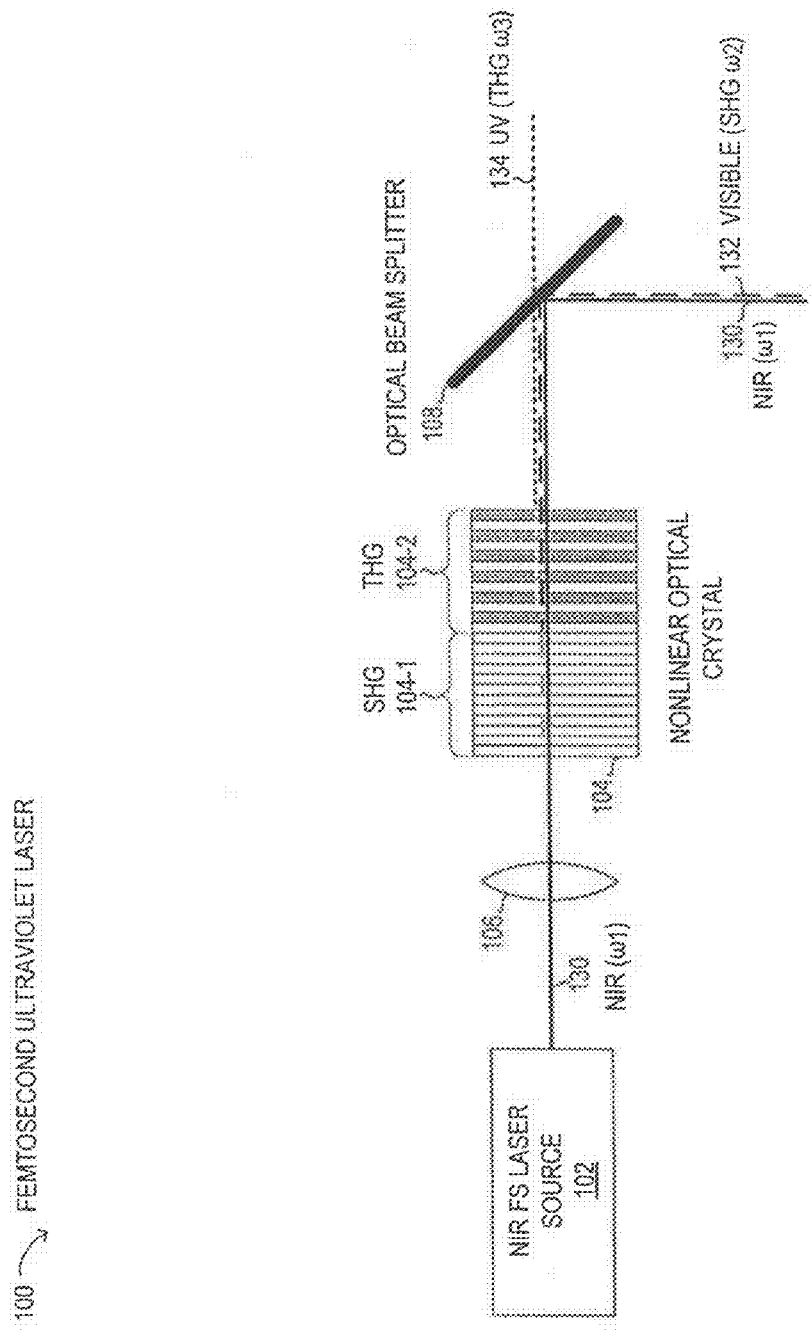
FIG. 1 is a block diagram of selected elements of an embodiment of a femtosecond ultraviolet laser.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective element. Thus, for example, device '12-1' refers to an instance of a device class, which may be referred to collectively as devices '12' and any one of which may be referred to generically as a device '12'.

As noted, femtosecond near infrared lasers have been commercially developed for various applications, such as eye surgery. However, in different applications, femtosecond laser sources having higher frequency (or shorter wavelengths) may be desirable. For example, femtosecond ultraviolet lasers may be desired in ophthalmology to precisely cut tissue, reduce pulse energy, decrease a destruction volume of a laser incision, and avoid undesired radiation penetration into deeper tissues. Furthermore, femtosecond ultraviolet lasers may provide unique benefits in material processing applications where precise or selective material removal of plastics, ceramics, and metals is desired.

As will be described in further detail, stabile, robust, and optically efficient generation of third harmonic fs laser pulses is disclosed using periodically-poled quasi-phase-matched crystals (PPQPMC) having different numbers of periodic or "poled" crystalline layers that enable a long conversion length without back-conversion and without a special phase-matching orientation of the PPQPMC that may be difficult to achieve and maintain.

In contrast to the PPQMC disclosed herein, generation of ultraviolet laser pulses has been typically performed using a 2-step optical process with a near infrared (NIR) input laser operating at or near 1000 nm wavelength, referred to here as a fundamental frequency $\omega_1$. In a first step, referred to as second harmonic generation (SHG), a frequency doubling of the NIR source laser may be accomplished to generate $\omega_2$ where $\omega_2=2\omega_1$ using a first crystal that is cut and oriented according to a first phase-matching angle for SHG. In a second step, referred to as third harmonic generation (THG), using a remaining portion of the NIR source laser and the generated SHG, a frequency sum of the NIR and the SHG may be attained to generate $\omega_3$ where $\omega_3=3\omega_1=\omega_1+\omega_2$. Accordingly, the second step may also be referred to as sum frequency generation (SFG). The second step may involve using a second crystal that is cut and oriented according to a second phase-matching angle for THG that is different from the first phase-matching angle. The generation, or conversion, of laser frequencies for SHG and THG is typically performed using separate nonlinear optical bulk materials, such as barium borate (BBO) and lithium triborate (LBO), which are used in bulk crystalline form. The natural beam walk-off and the pulse delay between $\omega_1$ and $\omega_2$ may result in significant difficulty to achieve a higher conversion efficiency in generating $\omega_3$ using the separate dual crystal method. Many typical instruments for THG often employ optical configurations with added complexity, such as recollimation, refocusing, and a delay line.

Because of the 2-step process, 2 different bulk crystals are typically used for SHG and THG, which may result in a certain cost and effort to successfully implement. For example, an efficient THG may involve orienting incident laser beams to particular orientations of the crystallographic axes of the crystals, which is referred to as a phase-matching direction. Only in the phase-matching direction will the group velocity of the generating frequencies ($\omega_1$, $\omega_2$) be the same as the THG frequency ($\omega_3$) resulting in a desired impulse and energy conservation. Because the 2 crystals will be cut and oriented independently from one another, their adjustment sensitivity for alignment in the phase-matching direction may be quite high, which may result in relatively high alignment effort and short periods of operational stability. This alignment sensitivity carries over to a high sensitivity to the pointing direction of the fundamental frequency source. When the 2-step process is used with pulsed laser beams, additional constraints may apply as the pulse duration is shortened to the fs range, at least in part due to the large bandwidth of the laser pulse and the temporal and spatial overlapping of the extremely short pulse propagating through the crystal. In many optical arrangements, the crystal for THG does not have sufficient conversion bandwidth and additional optical path delay lines are used between the optical paths for the pulses of different frequencies, resulting in even greater adjustment effort and reduced stability, due to the very high accuracy and precision of the optical paths involved for fs pulses. Still further adding to the cost and effort of THG with short laser pulses in typical bulk 2 crystal systems, the bulk crystals used for THG should be as thin as possible to minimize pulse spreading due to group velocity delay (GVD), which may then lead to the use of chirp compensated mirrors to avoid frequency-dependent phase shifts. Also, the use of very thin crystals along the optical axis may reduce the conversion efficiency in the crystal, making high pulse energies even more difficult to achieve.

Referring now to the drawings, FIG. 1 is a block diagram showing selected elements of an embodiment of a femtosecond ultraviolet laser 100. Femtosecond ultraviolet laser 100 is not drawn to scale but is a schematic representation. In various embodiments, femtosecond ultraviolet laser 100 may be implemented with fewer or more components than illustrated in the exemplary embodiment of FIG. 1, which is shown for descriptive purposes. It is noted that, although femtosecond ultraviolet laser 100 is described herein with respect to certain wavelengths in the electromagnetic spectrum, femtosecond ultraviolet laser 100 may be tunable to operate with different wavelengths, in different embodiments. Although NIR beam 130, visible beam 132, and UV beam 134 are shown in an adjacent manner in FIG. 1 for descriptive clarity, it will be understood that all three beams are superimposed and travel confocally.

As shown, femtosecond ultraviolet laser 100 includes NIR fs laser source 102, which may be any of a variety of NIR fs laser sources that operate at certain NIR wavelengths, such as at 1053 nm, 1064 nm, etc. Furthermore, NIR fs laser source 102 may be adjustable to different power intensities, pulse durations, repetition rates, etc., as desired for particular applications, such as in ophthalmology, for example. NIR fs laser source 102 outputs NIR beam 130 at a fundamental wavelength that corresponds to frequency $\omega_1$, as described previously. Because NIR beam 130 is generally a pulsed beam, NIR beam 130, or at least some photons comprising NIR beam 130, may be referred to as a first laser pulse. In femtosecond ultraviolet laser 100, NIR beam 130 is directed to nonlinear optical crystal 104. As shown, prior to impinging on nonlinear optical crystal 104, a focusing element 106 is used to focus NIR beam 130, which may be used to improve generation of UV beam 134 at second portion 104-2 of nonlinear crystal 104. In certain embodiments, focusing element 106 may be omitted or replaced or duplicated as desired for a particular application of femtosecond ultraviolet laser 100. It is noted that focusing element 106 may represent a sole mechanically adjustable component of femtosecond ultraviolet laser 100, such that other remaining portions of femtosecond ultraviolet laser 100 may be implemented as a solid state device with no moving parts.

In FIG. 1, nonlinear optical crystal 104 comprises first portion 104-1 and second portion 104-2, which are arranged successively with respect to NIR beam 130 arriving from NIR fs laser source 102. At first portion 104-1 of nonlinear optical crystal 104, at least some photons from NIR beam 130 are converted to a second harmonic wavelength corresponding to frequency $\omega_2$, as described previously, through a nonlinear second harmonic generation (SHG) process resulting in visible beam 132. Because first portion 104-1 may have a virtually long interaction length as a result of the periodic poling layers, visible beam 132 may begin at some location within first portion 104-1 and is emitted by first portion 104-1 along with remaining photons of NIR beam 130 that were not converted. Because NIR beam 130 is generally a pulsed beam, visible beam 132, or at least some photons comprising visible beam 132, may be referred to as a second laser pulse.

In femtosecond ultraviolet laser 100, nonlinear optical crystal 104 may comprise a periodically-poled quasi-phase-matched crystal (PPQPMC), for which periodic poled layers are schematically illustrated in cross section in FIG. 1 for descriptive purposes and are not drawn to scale. The periodic poling may be formed as material layers having a specified periodicity that corresponds to a particular wavelength tuning. The material layers may be formed by photolithographic patterning of a crystallographic c-plane according to the specified periodicity. The periodicity may be in the range of about 1 to 10 microns with an overall thickness range of first portion 104-1 or second portion 104-1 of about 100 to 1000 microns. An overall cross-section of nonlinear optical crystal 104 may be formed to an area of about 1 to 100 square millimeters. In some embodiments, first portion 104-1 and second portion 104-1 are formed as a single unitary material that comprises nonlinear optical crystal 104. In given embodiments, first portion 104-1 is comprised of a periodically poled magnesium oxide-doped stoichiometric lithium tantalate (MgSLT) crystal, while second portion 104-2 is comprised of a periodically poled lanthanum barium germanium oxide (LBGO) crystal.

Because of the optical properties of nonlinear optical crystal 104, a first cross-sectional intensity pattern of the first laser pulse may match a second cross-sectional intensity pattern of the second laser pulse. In other words, first portion 104-1 may maintain a cross-sectional intensity pattern of NTR beam 130, at least in shape if not in overall size, when generating visible beam 132 by SHG. Also, a first temporal coherence of the first laser pulse may substantially match a second temporal coherence of the second laser pulse. In other words, NIR beam 130 and visible beam 132 may exhibit about the same pulse duration, such that when NIR beam 130 is present as a femtosecond pulse, visible beam 132 is present as a femtosecond pulse. Furthermore, because nonlinear optical crystal 104 is relatively insensitive to an exact angle of incidence for SHG of NIR beam 130, a conversion efficiency for SHG may not be substantially affected by small changes in incident angle of NIR beam 130, and correspondingly, an incident direction of photons in an incident beam originating from NIR fs laser source 102. For this reason, femtosecond ultraviolet laser 100 may be relatively robust and stable, for example to temperature or vibration, and may be manufactured using standard optical processes such that an initial factory adjustment is suitable for a desired operational service life of femtosecond ultraviolet laser 100. Another important advantage of femtosecond ultraviolet laser 100 may result because the PPQPMC used for nonlinear optical crystal 104 does not produce spatial walk-off and exhibits relatively small temporal walk-off because of the relatively short length used.

At second portion 104-2 of nonlinear optical crystal 104, at least some photons from NIR beam 130 remaining after SHG and at least some photons from visible beam 132 are converted to a third harmonic wavelength corresponding to frequency $\omega_3$, as described previously, through a nonlinear third harmonic generation (THG) process resulting in UV beam 134. UV beam 134 may begin at some location within second portion 104-2 and is emitted by second portion 104-2 along with remaining photons of NIR beam 130 and visible beam 132 that were not respectively converted by either SHG or THG. Because NIR beam 130 is generally a pulsed beam, UV beam 134, or photons comprising UV beam 134, may be referred to as a third laser pulse.

Because of the optical properties of nonlinear optical crystal 104, the second cross-sectional intensity pattern of the second laser pulse may match a third cross-sectional intensity pattern of the third laser pulse. In other words, second portion 104-2 may maintain a cross-sectional intensity pattern of NIR beam 130, at least in shape if not in overall size, when generating UV beam 134 by THG. Also, the second temporal coherence of the second laser pulse (SHG) may substantially match a third temporal coherence of the third laser pulse (THG). In various embodiments, the first temporal coherence of the first laser pulse (NIR) may substantially match the second temporal coherence of the second laser pulse (SHG). In other words, NIR beam 130 and UV beam 134 may exhibit the same pulse duration, such that when NIR beam 130 is present as a femtosecond pulse, UV beam 134 is present as a femtosecond pulse. Because first portion 104-1 and second portion 104-1 are generally fixed together in close proximity, second portion 104-2 generally receives NIR beam 130 and visible beam 132 at the same angle of incidence as first portion 104-1.

Also, femtosecond ultraviolet laser 100 is shown with optical beam splitter 108 that separates UV beam 134 from NIR beam 130 and visible beam 132. Optical beam splitter 108 may be a harmonic separator, such as a dichroic mirror, when NIR beam 130 and visible beam 132 are used for a desired purpose, such as power monitoring. In other embodiments, optical beam splitter 108 may be a bandpass filter that is tuned to discriminately pass UV beam 134.

Accordingly, from second portion 104-2, the first laser pulse, the second laser pulse, and the third laser pulse are emitted in substantial temporal and spatial coherence. Because of the SHG and THG processes within nonlinear optical crystal 104, as described above, the beams emitted from nonlinear optical crystal 104 have varying power intensities. Specifically, NIR beam 130 has lower power intensity emerging from second portion 104-2 as compared to an incident intensity of NIR beam 130 at first portion 104-2. Typically, UV beam 134 has lower power intensity emerging from second portion 104-2 than visible beam 132. However, because nonlinear optical crystal 104 may have higher conversion efficiency at higher power intensity, UV beam 134 may be generated by femtosecond ultraviolet laser 100 at relatively high absolute power intensity levels, also because nonlinear optical crystal 104 is suitable for receiving very high power intensities of NIR beam 130. For example, in certain embodiments, a power intensity of UV beam 134 may be about 10% to 30% (THG conversion rate) of a power intensity of NIR beam 130 using femtosecond ultraviolet laser 100. In particular embodiments, femtosecond ultraviolet laser 100 may be suitable for power intensities of 1 Terawatt per square centimeter or greater and may operate in a stable manner for at least 100 hours to generate UV beam 134. Accordingly, femtosecond ultraviolet laser 100 may overcome various limitations and constraints of previously known methods of fs UV laser generation.

It is noted that, in various embodiments or arrangements of femtosecond ultraviolet laser 100, different implementations, layouts and diversions of beams may be used. For example, certain portions of optical paths used in femtosecond ultraviolet laser 100 may include optical fibers. In some embodiments, certain portions of optical paths used in femtosecond ultraviolet laser 100 may include optical waveguides. Certain portions of optical paths used in femtosecond ultraviolet laser 100 may represent optical paths within a medium, such as vacuum, free space, a gaseous environment, or the atmosphere. In given embodiments, a polarization element may be used with at least one of NIR beam 130, visible beam 132, and UV beam 134. In another arrangement, focusing element 106 may be omitted or replaced. In particular embodiments, at least a portion of the optical components included with femtosecond ultraviolet laser 100 may be miniaturized and combined into a compact unit having relatively small mass and external dimensions.

In FIG. 1, femtosecond ultraviolet laser 100 is not drawn to scale but is a schematic representation. Modifications, additions, or omissions may be made to femtosecond ultraviolet laser 100 without departing from the scope of the disclosure. The components and elements of femtosecond ultraviolet laser 100, as described herein, may be integrated or separated according to particular applications. Femtosecond ultraviolet laser 100 may be implemented using more, fewer, or different components in some embodiments.

Referring now to FIG. 2, a block diagram of selected elements of an embodiment of a method 200 for generating an fs UV laser source, as described herein, is depicted in flowchart form. Method 200 may be implemented by femtosecond ultraviolet laser 100 (see FIG. 1). It is noted that certain operations described in method 200 may be optional or may be rearranged in different embodiments.

Method 200 begins at step 202 by directing an fs NIR laser pulse at a nonlinear optical crystal. Step 202 may include focusing the fs NIR laser pulse. The wavelength (or frequency) of the NIR photons of the fs NIR laser pulse may be tuned or selected as desired. At step 204, at least some of the NIR photons are converted to visible photons at a first portion of the nonlinear optical crystal by SHG. The visible photons in step 204 may have a frequency $\omega_2$ while the NIR photons have a frequency $\omega_1$, as specified above. At step 206, at least some of the NIR photons and the visible photons may be converted to UV photons at a second portion of the nonlinear optical crystal by THG. The UV photons in step 206 may have a frequency $\omega_3$, as specified above. At step 208, the UV photons may be spectrally separated from an output pulse of the nonlinear optical crystal, the output pulse including at least some of the NIR photons, at least some of the visible photons, and the UV photons. At step 210, an fs UV laser pulse may be output. The UV photons may be output in the fs UV laser pulse that is temporally and spatially coherent with the fs NIR laser pulse.

As disclosed herein, a method and system for generating femtosecond (fs) ultraviolet (UV) laser pulses enables stabile, robust, and optically efficient generation of third harmonic fs laser pulses using periodically-poled quasi-phase-matched crystals (PPQPMC) having different numbers of periodically poled crystalline layers that enable a long conversion length without back-conversion and without a special phase-matching direction. The fs UV laser may have a high conversion efficiency and may be suitable for high power operation.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating femtosecond ultraviolet laser pulses, comprising:
   directing, at a nonlinear optical crystal, a first laser pulse having a fundamental wavelength in a near infrared portion of the electromagnetic spectrum, the first laser pulse having a pulse duration of less than 1000 femtoseconds;
   converting, at a first portion of the nonlinear optical crystal, at least some photons from the first laser pulse to a second harmonic wavelength of the fundamental wavelength to generate a second laser pulse within the nonlinear optical crystal;
   converting, at a second portion of the nonlinear optical crystal, at least some photons from the first laser pulse and the second laser pulse to a third harmonic wavelength of the fundamental wavelength to generate a third laser pulse within the nonlinear optical crystal, the second portion of the nonlinear optical crystal comprising a periodically poled lanthanum barium germanium oxide crystal; and
   outputting the third laser pulse from the nonlinear optical crystal, wherein the third laser pulse has the pulse duration.

2. The method of claim 1, further comprising:
   outputting the first laser pulse and the second laser pulse from the nonlinear optical crystal.

3. The method of claim 1, wherein the nonlinear optical crystal comprises a periodically-poled quasi-phase-matched crystal.

4. The method of claim 1, wherein the first portion of the nonlinear optical crystal and the second portion of the nonlinear optical crystal are formed as a single unitary material.

5. The method of claim 1, wherein the first portion of the nonlinear optical crystal comprises a periodically poled magnesium oxide-doped stoichiometric lithium tantalate crystal.

6. The method of claim 1, wherein directing the first laser pulse further comprises:
   focusing the first laser pulse at the nonlinear optical crystal.

7. The method of claim 1, further comprising:
spectrally filtering, at the output of the nonlinear optical crystal, the third laser pulse from the first laser pulse and the second laser pulse.

8. The method of claim 1, wherein the nonlinear optical crystal includes periodically poled layers that are tuned according to the fundamental wavelength.

9. The method of claim 1, wherein a first cross-sectional intensity pattern of the first laser pulse matches a second cross-sectional intensity pattern of the third laser pulse.

10. A femtosecond ultraviolet laser source, comprising:
a laser source comprising a femtosecond near infrared pulsed laser, the laser source configured to emit a plurality of pulses having a pulse duration of less than 1000 femtoseconds and having a fundamental wavelength; and
a nonlinear optical crystal having a first portion and a second portion successively oriented with regard to an orientation of incident first photons from the laser source, the second portion comprising a periodically poled lanthanum barium germanium oxide crystal, wherein:
the first portion of the nonlinear optical crystal receives the first photons from the laser source and converts at least some of the first photons to second photons having a second harmonic wavelength of the fundamental wavelength to generate a second laser pulse; and
the second portion of the nonlinear optical crystal receives at least some of the first photons and the second photons and converts at least some of the first photons and the second photons to third photons having a third harmonic wavelength of the fundamental wavelength to generate a third laser pulse having the pulse duration.

11. The femtosecond ultraviolet laser source of claim 10, wherein:
the second portion outputs the first laser pulse, the second laser pulse, and the third laser pulse from the nonlinear optical crystal.

12. The femtosecond ultraviolet laser source of claim 10, wherein the nonlinear optical crystal comprises a periodically-poled quasi-phase-matched crystal.

13. The femtosecond ultraviolet laser source of claim 10, wherein the first portion of the nonlinear optical crystal and the second portion of the nonlinear optical crystal are formed as a single unitary material.

14. The femtosecond ultraviolet laser source of claim 10, wherein the first portion of the nonlinear optical crystal comprises a periodically poled magnesium oxide-doped stoichiometric lithium tantalate crystal.

15. The femtosecond ultraviolet laser source of claim 10, further comprising:
a focusing element to focus the first laser pulse at the nonlinear optical crystal.

16. The femtosecond ultraviolet laser source of claim 10, further comprising:
an optical filter to spectrally separate, at the output of the nonlinear optical crystal, the third laser pulse from the first laser pulse and the second laser pulse.

17. The femtosecond ultraviolet laser source of claim 10, wherein the nonlinear optical crystal includes periodically poled layers that are tuned according to the fundamental wavelength.

18. The femtosecond ultraviolet laser source of claim 10, wherein a first cross-sectional intensity pattern of the first laser pulse matches a second cross-sectional intensity pattern of the third laser pulse.

\* \* \* \* \*